United States Patent
Morgan et al.

(10) Patent No.: US 9,416,662 B2
(45) Date of Patent: Aug. 16, 2016

(54) METHOD AND SYSTEM FOR PROVIDING COOLING FOR TURBINE COMPONENTS

(71) Applicant: General Electric Company, Schenectady, NY (US)

(72) Inventors: Victor John Morgan, Simpsonville, SC (US); Benjamin Paul Lacy, Greer, SC (US)

(73) Assignee: General Electric Company, Schenectady, NY (US)

( * ) Notice: Subject to any disclaimer, the term of this patent is extended or adjusted under 35 U.S.C. 154(b) by 358 days.

(21) Appl. No.: 14/016,769

(22) Filed: Sep. 3, 2013

(65) Prior Publication Data

US 2015/0059357 A1    Mar. 5, 2015

(51) Int. Cl.
| | | |
|---|---|---|
| *F01D 5/18* | (2006.01) | |
| *F02C 7/12* | (2006.01) | |
| *F01D 25/12* | (2006.01) | |
| *F01D 5/08* | (2006.01) | |

(52) U.S. Cl.
CPC ............... *F01D 5/081* (2013.01); *F01D 5/183* (2013.01); *F01D 25/12* (2013.01); *F02C 7/12* (2013.01); *F05D 2220/32* (2013.01); *F05D 2240/81* (2013.01); *F05D 2260/202* (2013.01); *F05D 2260/204* (2013.01); *Y10T 29/4932* (2015.01)

(58) Field of Classification Search
CPC . F02C 7/12; F05D 2260/20; F05D 2260/204; F23R 2900/03041; F01D 5/18; F01D 5/182; F01D 5/183; F01D 9/065; F01D 25/08; F01D 25/12

See application file for complete search history.

(56) References Cited

U.S. PATENT DOCUMENTS

| | | | |
|---|---|---|---|
| 5,626,462 A | 5/1997 | Jackson et al. | |
| 5,820,337 A | 10/1998 | Jackson et al. | |
| 5,957,657 A | 9/1999 | Akita et al. | |
| 6,329,015 B1 | 12/2001 | Fehrenbach et al. | |
| 6,905,302 B2 * | 6/2005 | Lee | F01D 5/288 415/115 |
| 7,363,707 B2 | 4/2008 | Powers | |
| 7,653,994 B2 | 2/2010 | Dasilva et al. | |
| 7,712,316 B2 * | 5/2010 | Spangler | F01D 5/186 415/115 |
| 7,900,458 B2 | 3/2011 | James et al. | |
| 8,210,815 B2 | 7/2012 | Bezencon et al. | |
| 2007/0205189 A1 | 9/2007 | Grossklaus et al. | |
| 2009/0255117 A1 | 10/2009 | Hovel et al. | |
| 2011/0236178 A1 * | 9/2011 | Devore | B22C 9/04 415/1 |
| 2011/0305582 A1 * | 12/2011 | Lee | F01D 5/186 416/97 R |
| 2012/0145371 A1 * | 6/2012 | Bunker | F01D 5/147 165/177 |
| 2012/0163984 A1 | 6/2012 | Bunker | |
| 2013/0183166 A1 * | 7/2013 | Lacy | F01D 5/186 416/97 R |

* cited by examiner

Primary Examiner — Andrew Nguyen
(74) Attorney, Agent, or Firm — Armstrong Teasdale LLP (57) ABSTRACT

A system for providing cooling for a turbine component that includes an outer surface exposed to combustion gases is provided. A component base includes at least one fluid supply passage coupleable to a source of cooling fluid. At least one feed passage communicates with the at least one fluid supply passage. At least one delivery channel communicates with the at least one feed passage. At least one cover layer covers the at least one feed passage and the at least one delivery channel, defining at least in part the component outer surface. At least one discharge passage extends to the outer surface. A diffuser section is defined in at least one of the at least one delivery channel and the at least one discharge passage, such that a fluid channeled through the system is diffused prior to discharge adjacent the outer surface.

15 Claims, 9 Drawing Sheets

METHOD AND SYSTEM FOR PROVIDING COOLING FOR TURBINE COMPONENTS

STATEMENT REGARDING FEDERALLY SPONSORED RESEARCH OR DEVELOPMENT

This invention was made with Government support under Contract No. DE-FC26-05NT42643, awarded by the Department of Energy (DOE) and the Government has certain rights in this invention.

BACKGROUND OF THE INVENTION

The present disclosure relates generally to turbomachinery, and, more specifically, to methods and systems for providing a cooling system for component internal structures and component surfaces within gas turbines.

In at least some known gas turbines, in a component such as an airfoil or nozzle that is exposed to hot combustion gases, an internal structure within the component is cooled using cooling air or other fluid that is channeled through microchannels defined within the internal structure. Typically, the microchannels extend below and substantially parallel to at least a portion of an outer surface of the component. Cooling air is supplied to the microchannels from a cooling air supply passage that is also defined within the component and coupled to a source of cooling air. In at least some known gas turbines, the microchannels terminate in a trench that is oriented substantially perpendicularly to the microchannels. Typically, the trench defines an elongated opening in the component outer surface. After receiving heat from the internal structure of the component, the cooling air is exhausted from the microchannels and discharged into the trench and out through the elongated opening. The discharged cooling air defines a cooling air film adjacent to the outer surface that facilitates reduction of heat transfer from the hot combustion gases through the outer surface of the component into the internal structure.

It is desirable to improve an efficiency of the microchannels to facilitate more effective transfer of heat from the internal structure of the component into the cooling air, such that a lower cooling air flow rate is required, towards facilitating an improvement of an overall efficiency of the gas turbine.

BRIEF DESCRIPTION OF THE INVENTION

In one aspect, a method of providing a cooling system for a turbine component that includes an outer surface that is exposed to combustion gases during turbine operation is provided. The method includes defining a component base with at least one fluid supply passage coupleable to a source of cooling fluid. The method also includes defining at least one feed passage in the component base, the at least one feed passage coupled in flow communication with the at least one fluid supply passage. The method also includes defining at least one delivery channel in the component base, the at least one delivery channel coupled in flow communication with the at least one feed passage. The method also includes defining at least one cover layer on the base to cover the at least one feed passage and the at least one delivery channel, and to define at least a portion of the component outer surface. The method also includes defining at least one discharge passage through the at least one cover layer, the at least one discharge passage coupled in flow communication with the at least one delivery channel and extends to the defined portion of the outer surface. The method also includes defining a diffuser section in at least one of the at least one delivery channel and the at least one discharge passage, such that a fluid channeled through the at least one delivery channel and the at least one discharge passage is diffused prior to discharge adjacent the defined portion of the outer surface.

In another aspect, a system for providing cooling of a turbine component that includes an outer surface that is exposed to combustion gases during turbine operation is provided. The system includes a component base that includes at least one fluid supply passage coupleable to a source of cooling fluid. The system also includes at least one feed passage defined in the component base, the at least one feed passage coupled in flow communication with the at least one fluid supply passage. The system also includes at least one delivery channel defined in the component base, the at least one delivery channel coupled in flow communication with the at least one feed passage. The method also includes at least one cover layer defined on the base to cover the at least one feed passage and the at least one delivery channel, the at least one cover layer defining at least a portion of the component outer surface. The method also includes at least one discharge passage defined through the at least one cover layer, such that the at least one discharge passage is coupled in flow communication with the at least one delivery channel and extends to the defined portion of the outer surface. The method also includes a diffuser section defined in at least one of the at least one delivery channel and the at least one discharge passage, such that a fluid channeled through the at least one delivery channel and the at least one discharge passage is diffused prior to discharge adjacent the defined portion of the outer surface.

In still another aspect, a gas turbine system is provided. The gas turbine system includes a compressor section. The gas turbine system also includes a combustion system coupled in flow communication with the compressor section. The gas turbine system also includes a turbine section coupled in flow communication with the combustion system. The turbine section includes a component base that includes at least one fluid supply passage coupleable to a source of cooling fluid. The turbine section also includes at least one feed passage defined in the component base, wherein the at least one feed passage is coupled in flow communication with the at least one fluid supply passage. The turbine section also includes at least one delivery channel defined in the component base, wherein the at least one delivery channel is coupled in flow communication with the at least one feed passage. The turbine section also includes at least one cover layer defined on the base to cover the at least one feed passage and the at least one delivery channel, wherein the at least one cover layer defines at least in part the component outer surface. The turbine section also includes at least one discharge passage defined through the at least one cover layer, wherein the at least one discharge passage is coupled in flow communication with the at least one delivery channel and extends to the outer surface. The turbine section also includes a diffuser section defined in at least one of the at least one delivery channel and the at least one discharge passage, such that a fluid channeled through the at least one delivery channel and the at least one discharge passage is diffused prior to discharge adjacent the outer surface.

DETAILED DESCRIPTION OF THE INVENTION

As used herein, the terms "axial" and "axially" refer to directions and orientations extending substantially parallel to a longitudinal axis of a gas turbine engine. Moreover, the terms "radial" and "radially" refer to directions and orientations extending substantially perpendicularly to the longitudinal axis of the gas turbine engine. In addition, as used herein, the terms "circumferential" and "circumferentially" refer to directions and orientations extending arcuately about the longitudinal axis of the gas turbine engine. It should also be appreciated that the term "fluid" as used herein includes any medium or material that flows, including, but not limited to, gas and air. As used herein, the term "turbine component" refers to any structure within a gas turbine that may be exposed to elevated temperatures and/or to combustion gases, including, but not limited to, rotor and stator blades and related components, combustor liners, transition pieces, and fuel nozzles.

Figure 1:
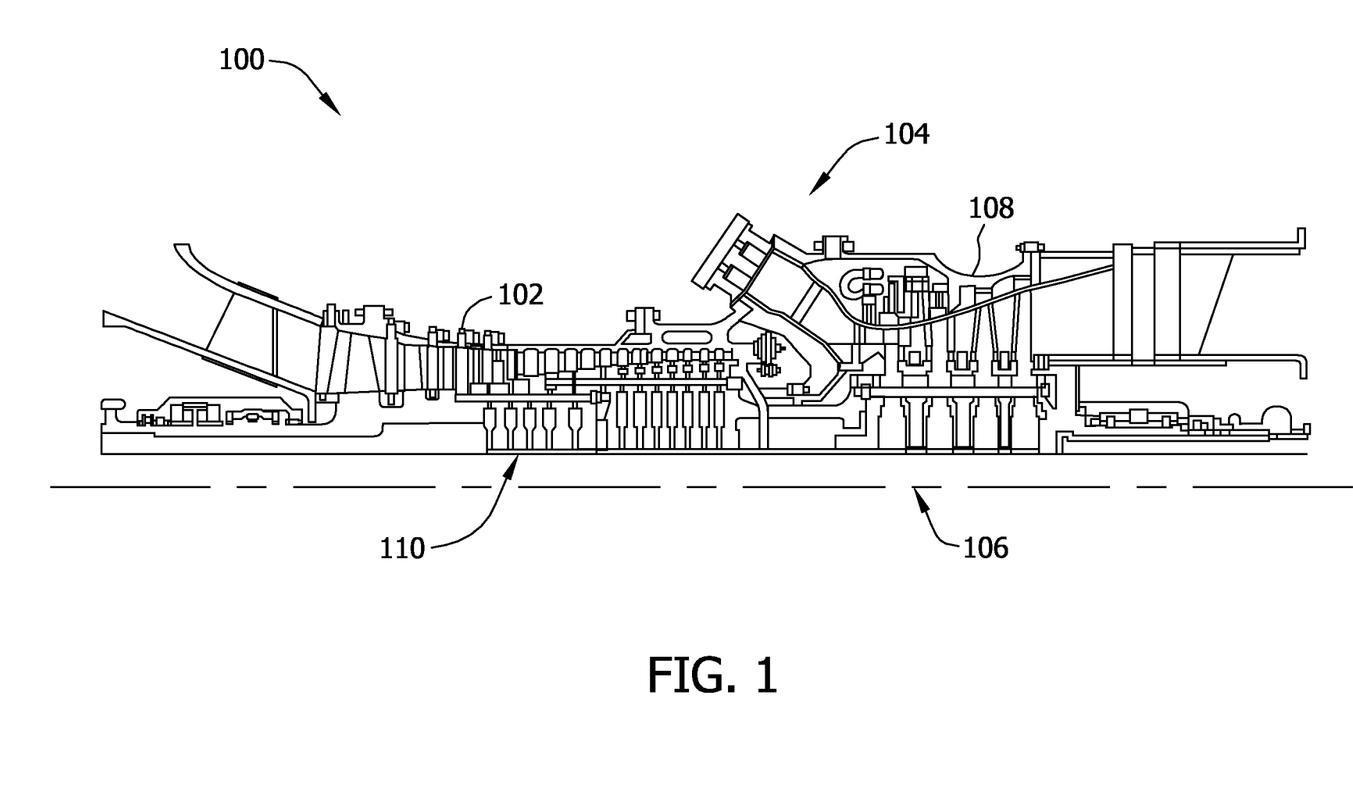
FIG. 1 is a schematic illustration of a gas turbine engine, in which an exemplary cooling method and system may be used.

FIG. 1 is a schematic illustration of an exemplary gas turbine engine 100. Engine 100 includes a compressor assembly 102 and a combustor assembly 104. Engine 100 also includes a turbine 108 and a common compressor/turbine shaft 110 (also sometimes referred to as a rotor 110).

In operation, air flows through compressor assembly 102 such that compressed air is supplied to combustor assembly 104. Fuel is channeled to a combustion region and/or zone (not shown) that is defined within combustor assembly 104 wherein the fuel is mixed with the air and ignited. Resulting combustion gases are channeled to turbine 108 wherein gas stream thermal energy is converted to mechanical rotational energy. Turbine 108 is rotatably coupled to rotor 110, for rotation about an axis of rotation 106.

Figure 2:
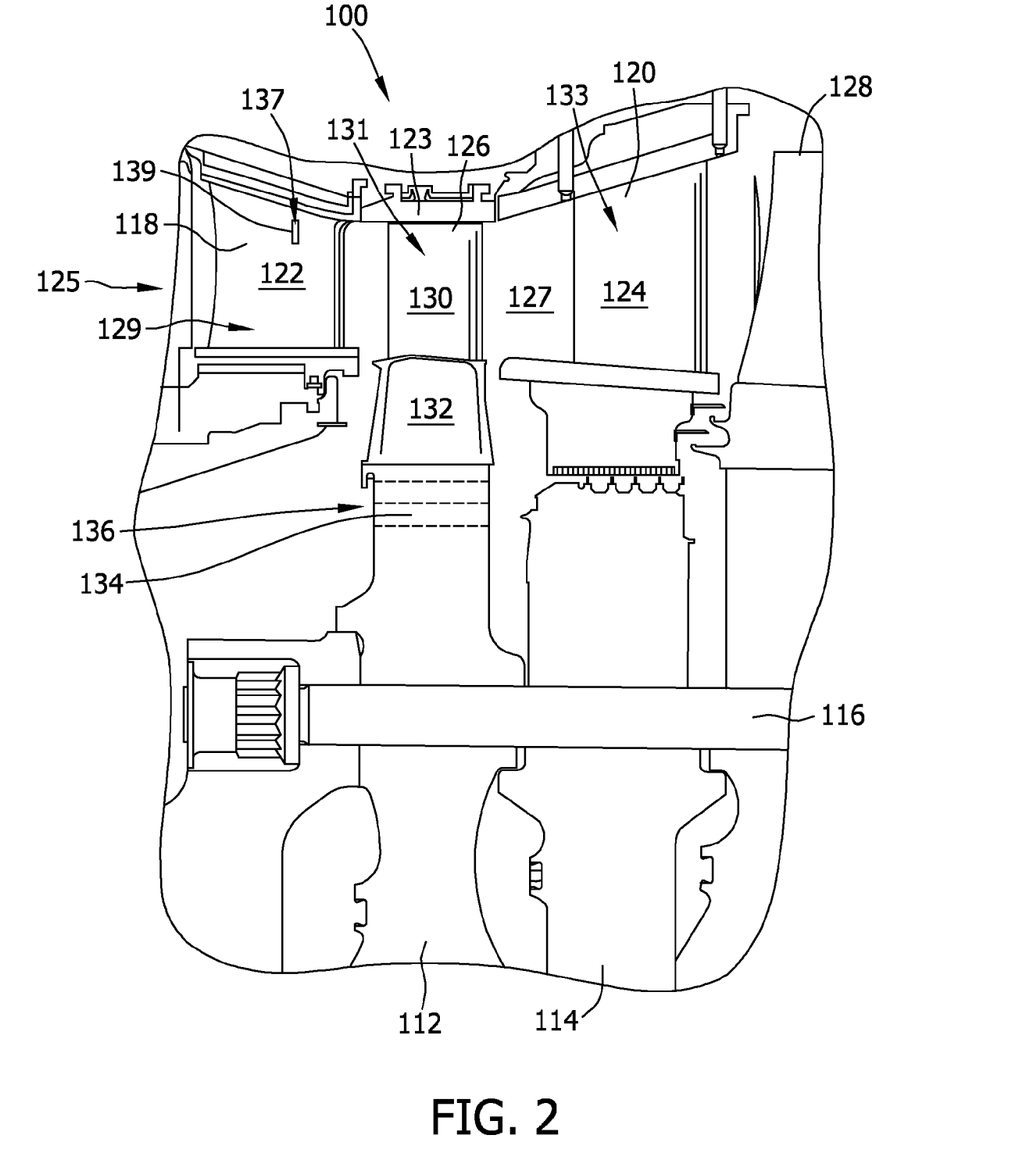
FIG. 2 is an enlarged schematic side sectional view of a portion of the gas turbine engine illustrated in FIG. 1.

FIG. 2 is an enlarged schematic illustration of a portion of gas turbine engine 100 that includes axially spaced apart rotor disks 112 and spacers 114 that are coupled to each other, for example, by a plurality of circumferentially-spaced, axially-extending bolts 116. Although bolts 116 are shown in FIG. 2, for facilitating coupling of disks 112 to spacers 114, any other suitable coupling structures may be used that enable gas turbine engine 100 to function as described herein. Gas turbine engine 100 includes, for example, a plurality of first-stage nozzles 118 and a plurality of second-stage nozzles 120. Each plurality of nozzles 118 and 120 includes a plurality of circumferentially-spaced stator vanes, such as stator vanes 122 and 124. A plurality of first-stage rotor blades 126 are coupled, for example, via disk 112, to rotor 110 (shown in FIG. 1), for rotation between nozzles 118 and 120. In the exemplary embodiment, each rotor blade 126 includes an airfoil 130 coupled to a shank 132. Similarly, a plurality of second-stage rotor blades 128 likewise is coupled to rotor 110, for rotation between second-stage nozzles 120 and a third stage of nozzles (not shown). Although two stages of rotor blades 126 and 128, and two stages of nozzles 118 and 120, are shown and described herein, at least some known gas turbine engines include different numbers of nozzle and rotor blade stages.

Each rotor blade 126 is coupled to rotor disk 112 using any suitable coupling method that enables gas turbine engine 100 to function as described herein. Specifically, in the exemplary embodiment, each rotor blade 126 includes a dovetail 134 coupled to shank 132. Dovetail 134 is insertably received axially (i.e., in a direction substantially parallel to axis of rotation 106 illustrated in FIG. 1) within a suitably-shaped slot 136 defined in rotor disk 112. In an example gas turbine engine 100, a flow 125 of hot combustion gases is channeled through rotor/stator cavity 127, exposing outer surfaces 129, 131, and 133, of stator vane 122, airfoil 130, stator vane 124, or a shroud 123, respectively, to high temperatures and potential corresponding thermal stresses and/or thermal degradation. To at least partially address such exposure, one or more of stator vane 122, airfoil 130, stator vane 124 and/or shroud 123 and/or any other hot component in the turbine are provided with a cooling system 137 that includes a cooling air supply channel coupled to subsurface microchannels (not shown), as previously described, that terminate, for example, in a discharge passage in the form of a trench 139 opening onto surface 129 of stator vane 122. Although air is specifically described, in alternative embodiments a fluid other than air is used to cool components exposed to combustion gases. It should also be appreciated that the term "fluid" as used herein includes any medium or material that flows, including, but not limited to, gas, steam, and air.

Figure 3:
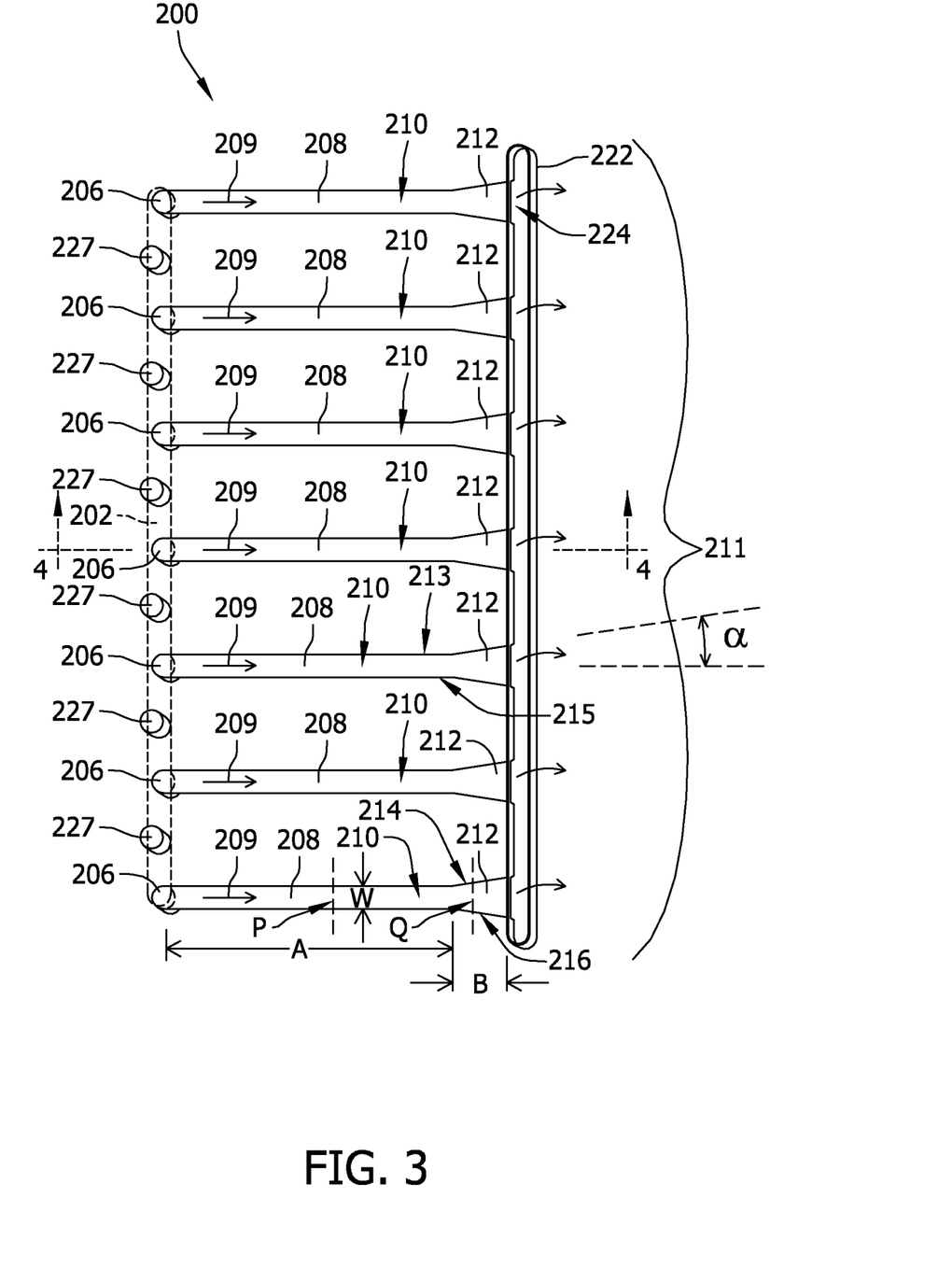
FIG. 3 is a top perspective view of an exemplary microchannel system that can be used in the cooling system illustrated in FIG. 2.
Figure 4:
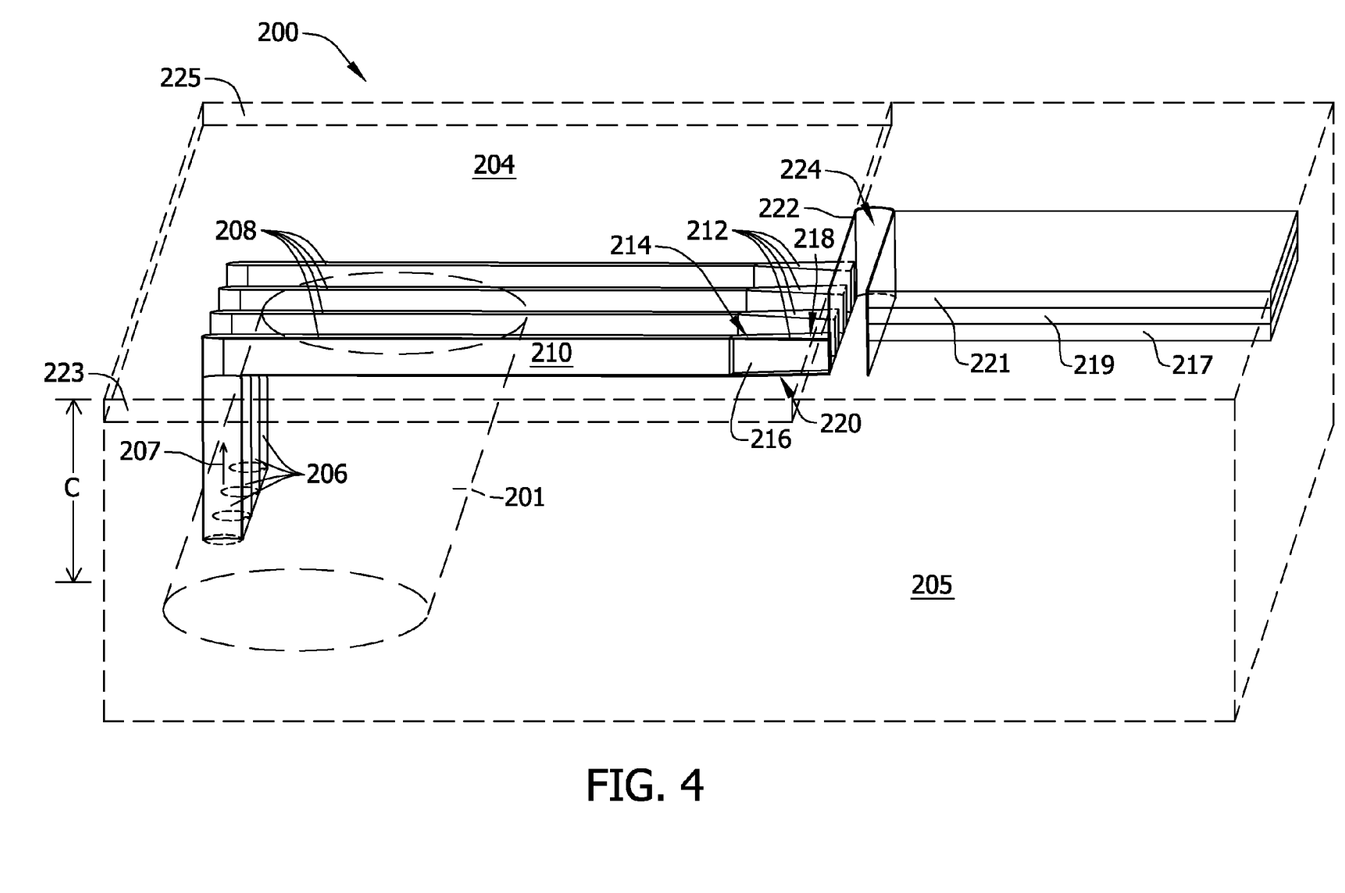
FIG. 4 is a side perspective view of the microchannel system illustrated in FIG. 3.

FIG. 3 is a top perspective view of an exemplary microchannel system 200 that can be used in cooling system 137. FIG. 4 is a side perspective view of microchannel system 200. As previously described, microchannel system 200 is used to supply cooling air through any structure within engine 100 (shown in FIGS. 1 and 2) for which both internal cooling and surface film cooling are desired. Microchannel system 200 includes a transversely-extending distribution passage 202 into which cooling air is channeled from a cooling air supply channel 201. Cooling air supply channel 201 has any suitable configuration sufficient to enable system 200 to function as described. In the exemplary embodiment, distribution passage 202 is positioned a distance C below a component surface 204 (shown in FIG. 4) of a component body 205. Distribution passage 202 is coupled in flow communication to a plurality of feed passages 206. In the exemplary embodiment, feed passages have a width or diameter of about 5 mils to about 120 mils, though in other embodiments, different values may be used. Each feed passage 206 is coupled in flow communication with a corresponding delivery channel 208. In each delivery channel 208, an air flow 209 proceeds in a direction indicated by the arrows. In the exemplary embodiment, each delivery channel 208 includes a section 210 that is configured with a substantially constant cross-sectional area along a length A, wherein the cross-sectional area is measured in a plane P extending perpendicularly to air flow 209.

Section 210 includes a side wall 213 and an opposite side wall 215. Each section 210 terminates in a diffuser section 212 that is configured with diverging side walls 214 and 216 (shown in FIG. 4), and substantially parallel top wall 218 and bottom wall 220. Accordingly, diffuser section 212 includes an increasing cross-sectional area along a length B, wherein the cross-sectional area is measured in a plane Q extending perpendicularly to the direction of air flow 209. In the exemplary embodiment, length B is equal to about 3 to about 5 times a width W of channel section 210, wherein width W is from about 5 mils to about 120 mils. In other embodiments, length B is any value that enables system 200 to function as described.

In the exemplary embodiment, wall 214 diverges from side wall 213 and/or wall 216 diverges from side wall 215 by an angle α, wherein α ranges from about 5° to about 15°. In alternative embodiments, other angle values are used that are sufficient to enable system 200 to function as described. Moreover, angle α does not have to be constant along the length of walls 213 and/or 216, but can vary. That is, one or both of walls 213 and/or 216 has one or more bends therein, or is curved. Each diffuser section 212 is coupled in flow communication with a discharge passage in the form of a transversely-extending trench 222. Trench 222 includes a narrow elongated opening 224 in surface 204.

In the exemplary embodiment, distribution passage 202 and feed passages 206 have any cross-sectional configuration, including but not limited to circular, oval, square, rectangular, or polygonal, that enables system 200 to function as described herein. In the embodiment of FIGS. 3 and 4, delivery channels 208 (including sections 210 and diffuser sections 212) have rectangular cross-sectional configurations. In alternative embodiments, delivery channels 208 have any other cross-sectional configuration that enables system 200 to function as described herein.

In the exemplary embodiment, microchannel system 200 is defined by first casting a component body 205 (shown in FIG. 4). Moreover, in the exemplary embodiment, air supply channel 201 (shown in FIG. 3) and/or distribution passage 202 are created during casting of component body 205. During and/or casting component body 205, feed passages 206, and delivery channels 208 are defined using any suitable passage-defining method, including but not limited to cutting tool-based machining and/or milling, EDM (electrical discharge machining), water machining, laser machining, and/or any other passage-defining (for example, by material removal) method that enables microchannel system 200 to function as described herein. In alternative embodiments, one or more of structures 206, 208, 212 and/or 222 is cast-in. If one or more of structures 206, 208, 212, and/or 222 is cast-in, then a region 225 between surface 204 and one or more of structures 206, 208, and/or 212 defines in part a cover layer 223. In the exemplary embodiment, one or more of structures 202, 206, 208 and/or 212 is not cast-in, but is open at surface 204. In that embodiment, after feed passages 206 and delivery channels 208 are defined in a surface 204 of body 205, a layer 217 of pre-sintered preform ("PSP") braze material is coupled to body 205 to cover feed passages 206 and delivery channels 208. Thereafter, a bond coat 219 is coupled to PSP layer 217, and a DVC ("dense vertically cracked") coat 221 is coupled to bond coat 219, to further cover feed passages 206 and delivery channels 208, in addition to PSP layer 217. In one alternative embodiment, a metal alloy is welded over one or more of structures 206, 208, and/or 212, after which coats 219 and/or 221 are applied. In another alternative embodiment, coats 219 and/or 221 are directly applied over one or more of structures 206, 208, and/or 212, using bridging techniques so that coats 219 and/or 221 do not fill structures 206, 208, and/or 212. Although three cover layers are described herein, in alternative embodiments, any number of cover layers is used that enables system 200 to function as described herein. After placement of layers 217, 219, and 221, trench 222 is defined using one of the passage-defining techniques previously described. In alternative embodiments, any suitable formation method for defining feed passages 206, delivery channels 208, and/or trench 222 is used that enables system 200 to function as described. In the exemplary embodiment, air supply channel 201, distribution passage 202, feed passages 206, delivery channels 208, and/or trench 222 have any suitable dimensions that enable microchannel system 200 to function as described herein.

In operation, as illustrated in FIG. 3, cooling air flow 207 is channeled from air supply channel 201 into distribution passage 202, where flow 207 is divided into a plurality of flows 209 that are channeled through feed passages 306 and into delivery channels 208. As flows 209 are discharged from sections 210 and enter diffuser sections 212, flows 209 are facilitated to spread or expand as they are channeled into trench 222. In trench 222, flows 209 merge, and are discharged from trench 222 as a film 211.

Figure 5:
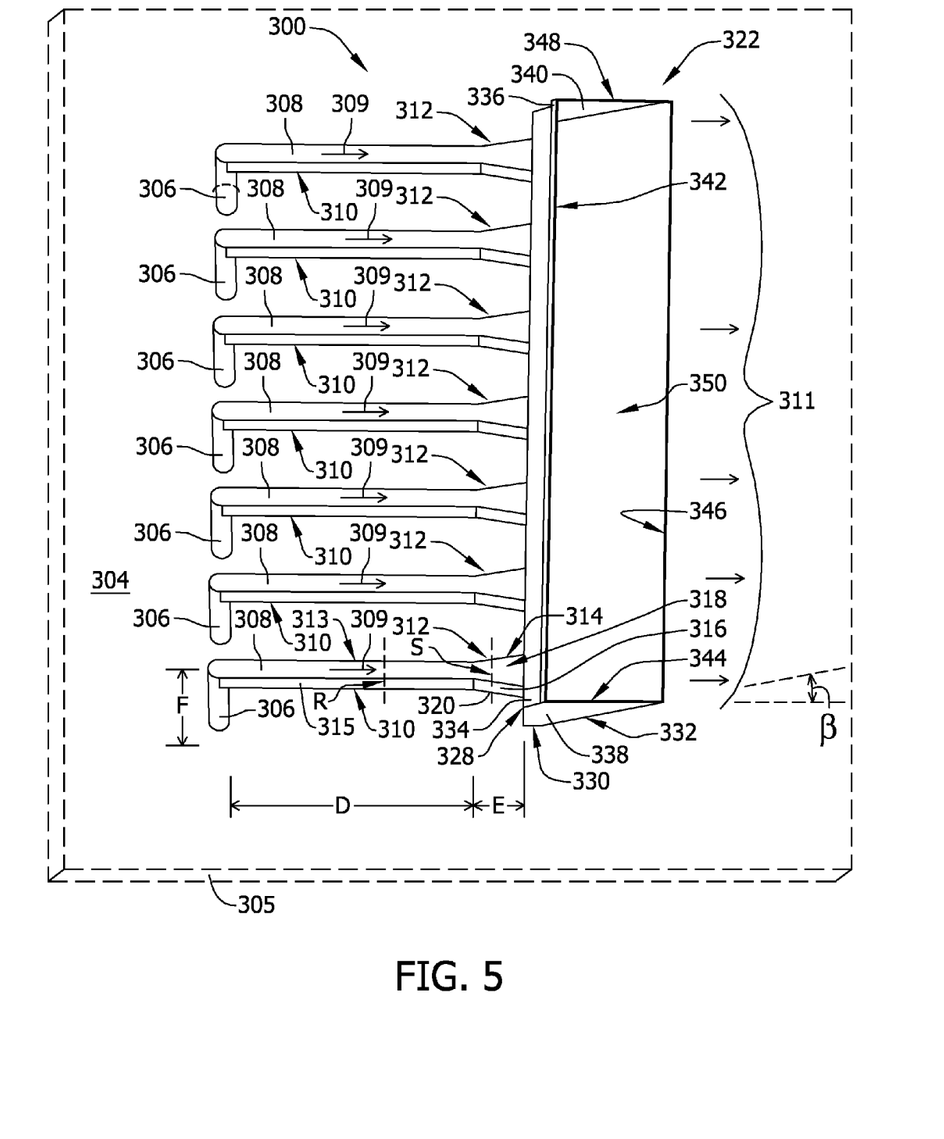
FIG. 5 is a top perspective view of an alternative exemplary microchannel system that can be used in the cooling system illustrated in FIG. 2.

FIG. 5 is a top perspective view of an alternative exemplary microchannel system 300 that can be used in cooling system 137. Microchannel system 300 is used to supply cooling air through any structure within engine 100 (shown in FIGS. 1 and 2) for which both internal cooling and surface film cooling are desired. Microchannel system 300 includes a transversely-extending distribution passage 302 into which cooling air is channeled from a cooling air supply channel 301, which has any suitable configuration sufficient to enable system 300 to function as described. In the exemplary embodiment, distribution passage 302 is positioned a distance F below a component surface 304 of a component 305. Distribution passage 302 is coupled in flow communication to a plurality of feed passages 306. Each feed passage 306 is coupled in flow communication with a corresponding delivery channel 308. Air flows 309 are channeled in a direction indicated by the arrows. In the exemplary embodiment, each delivery channel 308 includes a section 310 that is configured with a substantially constant cross-sectional area along a length D, wherein the cross-sectional area is measured in a plane R extending perpendicularly to the direction of flow. In the exemplary embodiment, feed passages 306 and sections 310 are provided with dimensions similar to those of feed passages 206 and sections 210 illustrated in FIGS. 3 and 4.

Section 310 includes a side wall 313 and an opposite side wall 315. Each section 310 terminates in a diffuser section 312 that is configured with diverging side walls 314 and 316, and substantially parallel top wall 318 and bottom wall 320, resulting in an increasing cross-sectional area along a length E, wherein the cross-sectional area is measured in a plane S extending perpendicularly to the direction of flow 209. In the exemplary embodiment, length E is equal to about 3 to about 5 times a width X of channel section 310. In other embodiments, length E is any length that enables system 300 to function as described. In the exemplary embodiment, one or both of walls 314 and 316 diverge from respective side walls 313 and 315, in a manner similar that described with respect to walls 214 and 216, illustrated in FIG. 3. Each diffuser section 312 is coupled in flow communication with discharge passage in the form of a transversely-extending trough 322.

Trough 322 includes a first inlet end 328, a bottom wall 330, an inclined outlet end wall 332 that intersects surface 304, an inclined first inlet end wall 334, a more steeply inclined second inlet end wall 336, a first side wall 338, and a second side wall 340 opposite first side wall 338. An edge 342 of second inlet end wall 336, an edge 344 of first side wall 338, an edge 346 of outlet end wall 332, and an edge 348 of second side wall 340 define an opening 350 of trough 322. In the exemplary embodiment, outlet end wall 332 and edge 344 or edge 348 (both of which are located at surface 304) define between them an angle β, wherein β is between about 20° and about 90°. In other embodiments, any other value for β is used that enables system 300 to function as described herein. Moreover, one or both of walls 334 and 336 defines a similar angle (not shown) with respect to edges 344 and/or 348 (and correspondingly to surface 304). As described with respect to system 200, angle β does not have to be constant along the length of walls 334 and/or 336. In the exemplary embodiment, distribution passage 302 and feed passages 306 have any cross-sectional configuration, including but not limited to circular, oval, square, rectangular, or polygonal, that enables system 300 to function as described herein. In the embodiment of FIG. 5, delivery channels 308 (including sections 310 and diffuser sections 312) have rectangular cross-sectional configurations. In alternative embodiments, delivery channels 308 have any other cross-sectional configuration that enables system 300 to function as described herein. In an alternative embodiment (not shown), trough 322 may be extended in the direction of channel sections 310, to accommodate a pin-bank (not shown) that includes a plurality of spaced-apart pins that extend between bottom wall 330 and end wall 334.

In the exemplary embodiment, air supply channel 301, distribution passage 302, feed passages 306, delivery channels 308, and/or trough 322 are defined using any suitable passage-defining method, such as that described above with respect to system 200. After air supply channel 301, distribution passage 302, feed passages 306, and delivery channels 308 are defined, using any of the methods described herein, one or more cover layers (not shown), as described with respect to system 200 of FIGS. 3 and 4, are coupled to component 305 to form at least part of outer surface 304. After coupling of the one or more cover layers, trough 322 is defined, using any method as described herein. In an alternative embodiment, one or more of structures 306, 308, and/or 322 is cast-in, as described herein.

In operation, as illustrated in FIG. 5, cooling air flow 307 is channeled from air supply channel 301 into distribution passage 302, where flow 307 is divided into a plurality of flows 309 that are channeled through feed passages 306 and into delivery channels 308. As flows 309 are discharged from sections 310 and enter diffuser sections 312, flows 309 are facilitated to expand ("diffuse") as they are channeled into trough 322. In trough 322, flows 309 merge, and are discharged from trough 322 as a film 311. As outlet end wall 332 diverges from first inlet end wall 334, and particularly also from second inlet end wall 336, cooling air within trough 322 is further diffused prior to discharge from trough 322 as film 311.

Figure 6:
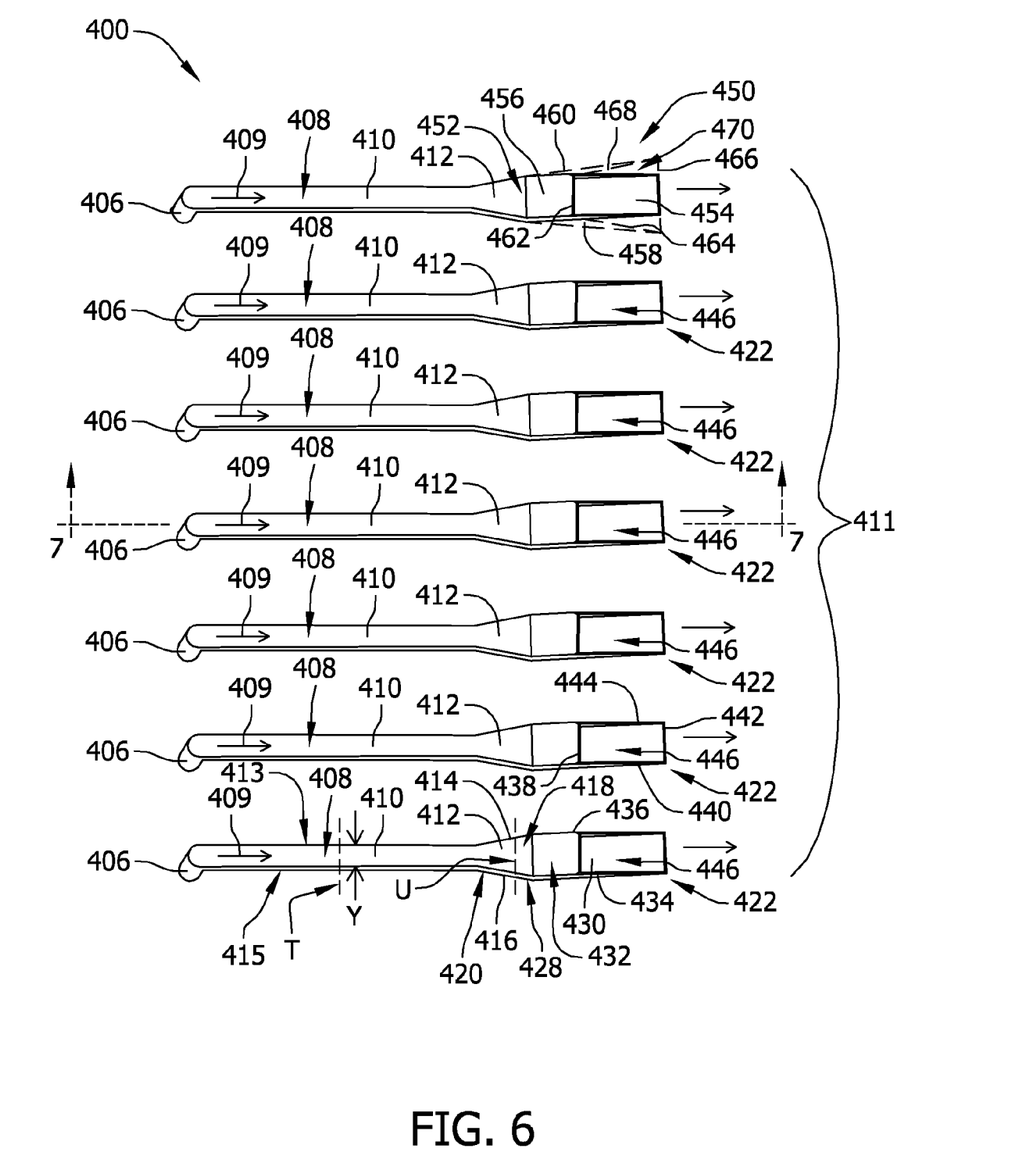
FIG. 6 is a top perspective view of an alternative exemplary microchannel system that can be used in in the cooling system illustrated in FIG. 2.
Figure 7:
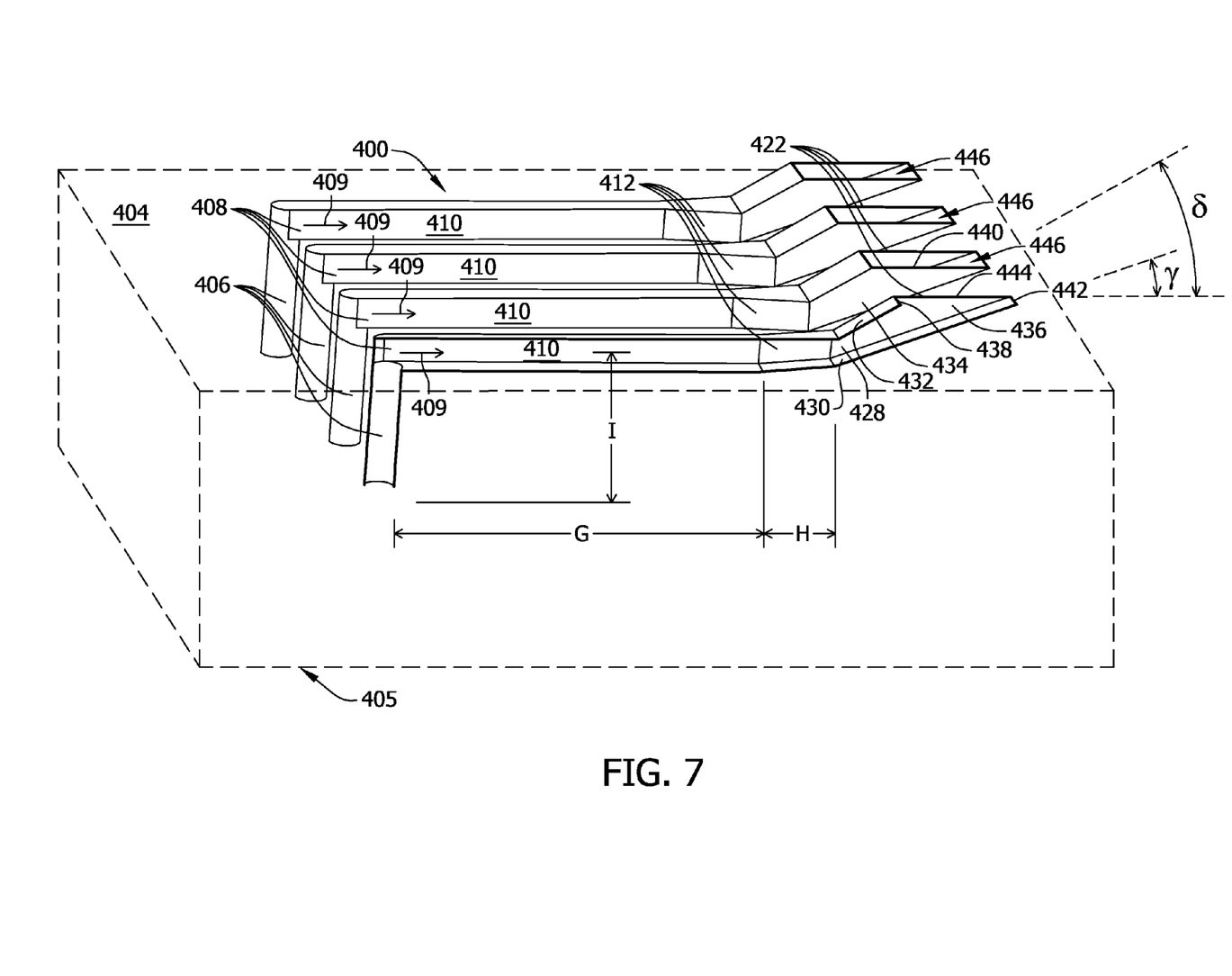
FIG. 7 is a side perspective view of the microchannel system illustrated in FIG. 6.

FIG. 6 is a top perspective view of another alternative exemplary microchannel system 400 that can be used in cooling system 137. FIG. 7 is a side perspective view of microchannel system 400. Microchannel system 400 is used to supply cooling air through any structure within engine 100 (shown in FIGS. 1 and 2) for which both internal cooling and surface film cooling are desired. Microchannel system 400 includes a transversely-extending distribution passage 402 into which a cooling air flow 407 is channeled from a cooling air supply channel 401, which has any suitable configuration sufficient to enable system 400 to function as described. In the exemplary embodiment, distribution passage 402 is positioned a distance I below a component surface 404 (shown in FIG. 7) of a component 405. Distribution passage 402 is coupled in flow communication to a plurality of feed passages 406. Each feed passage 406 is coupled in flow communication with a corresponding delivery channel 408. Air flows 409 are channeled in a direction indicated by the arrows.

In the exemplary embodiment, each delivery channel 408 includes a section 410 that is configured with a substantially constant cross-sectional area along a length G, wherein the cross-sectional area is measured in a plane T extending perpendicularly to the direction of flow. In the exemplary embodiment, feed passages 406 and sections 410 are provided with dimensions similar to those of feed passages 206 and sections 210 illustrated in FIGS. 3 and 4. Each section 410 includes a side wall 413 and an opposite side wall 415. Each section 410 terminates in a diffuser section 412 that is configured with diverging side walls 414 and 416 (shown in FIG. 7), and substantially parallel top wall 418 and bottom wall 420. In the exemplary embodiment, wall 314 diverges from side wall 413 and/or wall 416 diverges from side wall 415, in a manner similar that described with respect to walls 214 and 216, illustrated in FIG. 3. Section 412 includes an increasing cross-sectional area along a length H (illustrated in FIG. 7), wherein the cross-sectional area is measured in a plane U extending perpendicularly to the direction of flow 409. In the exemplary embodiment, diffuser section 412 has a length that is equal to about 3 to about 5 times a width Y of channel section 410. In other embodiments, diffuser section 412 has any length that enables system 400 to function as described. Each diffuser section 412 is coupled in flow communication with a discharge passage in the form of an inclined nozzle 422.

Each nozzle 422 includes a first inlet end 428, an inclined outlet end wall 430 that intersects component surface 404, an inclined inlet end wall 432, a first side wall 434, and a second side wall 436 opposite first side wall 434. An edge 438 of inlet end wall 432, an edge 440 of first side wall 434, an edge 442 of outlet end wall 430, and an edge 444 of second side wall 436 define an opening 446 of each nozzle 422. In the exemplary embodiment, walls 430 and 432 diverge, while walls 434 and 436 are substantially parallel. In the exemplary embodiment, outlet end wall 430 and edge 440 or edge 444, both of which are located at surface 404 (shown in FIG. 7) define between them an angle γ, wherein γ is between about 20° and about 90°. In other embodiments, any other value for γ is used that enables system 300 to function as described herein. Moreover, wall 432 defines an angle δ with respect to edge 440 and/or 444, wherein δ is between about 20° and about 90°. In an alternative embodiment, walls 430 and 432 are substantially parallel, while walls 434 and 436 diverge, in a manner similar to walls 214 and 216 (shown in FIG. 3). In another alternative embodiment, all of walls 430, 432, 434, and 436 diverge.

In the exemplary embodiment, distribution passage 402 and feed passages 406 have any cross-sectional configuration, including but not limited to circular, oval, square, rectangular, or polygonal, that enables system 400 to function as described herein. In the embodiment of FIGS. 6 and 7, delivery channels 408 (including sections 410 and diffuser sections 412) have rectangular cross-sectional configurations. In alternative embodiments, delivery channels 408 have any other cross-sectional configuration that enables system 400 to function as described herein.

FIG. 6 also illustrates an alternative nozzle 450 that can be used in microchannel system 400. Alternative nozzle 450 (shown in broken lines), includes an inlet end 452, an inclined bottom wall 454 that intersects surface 404, an inclined top wall 456, a first side wall 458, and a second side wall 460 opposite first side wall 458. An edge 462 of top wall 456, an edge 464 of first side wall 458, an edge 466 of bottom wall 454, and an edge 468 of second side wall 460 define an opening 470 of alternative nozzle 450.

In the exemplary embodiment, air supply channel 401, distribution passage 402, feed passages 406, delivery channels 408, and/or nozzles 422 and/or alternative nozzles 450 are defined using any suitable passage-defining method, such as that described above with respect to system 200. Moreover, in the exemplary embodiment, air supply channel 401, distribution passage 402, feed passages 406, delivery channels 408, and/or nozzles 422 and/or alternative nozzles 450 have any suitable dimensions that enable microchannel system 400 to function as described herein. After air supply channel 401, distribution passage 402, feed passages 406, and delivery channels 408 have been defined using any of the methods described herein, one or more cover layers (not shown), as described with respect to system 200 of FIGS. 3 and 4, are coupled to component 405 to form at least part of component surface 404. After coupling of the one or more cover layers, nozzles 422 are defined, using any method as described herein. In an alternative embodiment, one or more of structures 406, 408, and/or 422 is cast-in, as described herein.

In operation, as illustrated in FIG. 7, cooling air flow 407 is channeled from air supply channel 401 into distribution passage 402, where flow 407 is divided into a plurality of flows 409 that are channeled through feed passages 406 and into delivery channels 408. As flows 409 are discharged from sections 410 and enter diffuser sections 412, flows 409 are facilitated to expand ("diffuse") as they are channeled into nozzles 422. Flows 409 and are discharged from nozzles 422 at surface 404, and merge as a film 411. As outlet end walls 430 diverge from inlet ends 428, cooling air within nozzles 422 is further diffused prior to discharge from nozzles 422.

Figure 8:
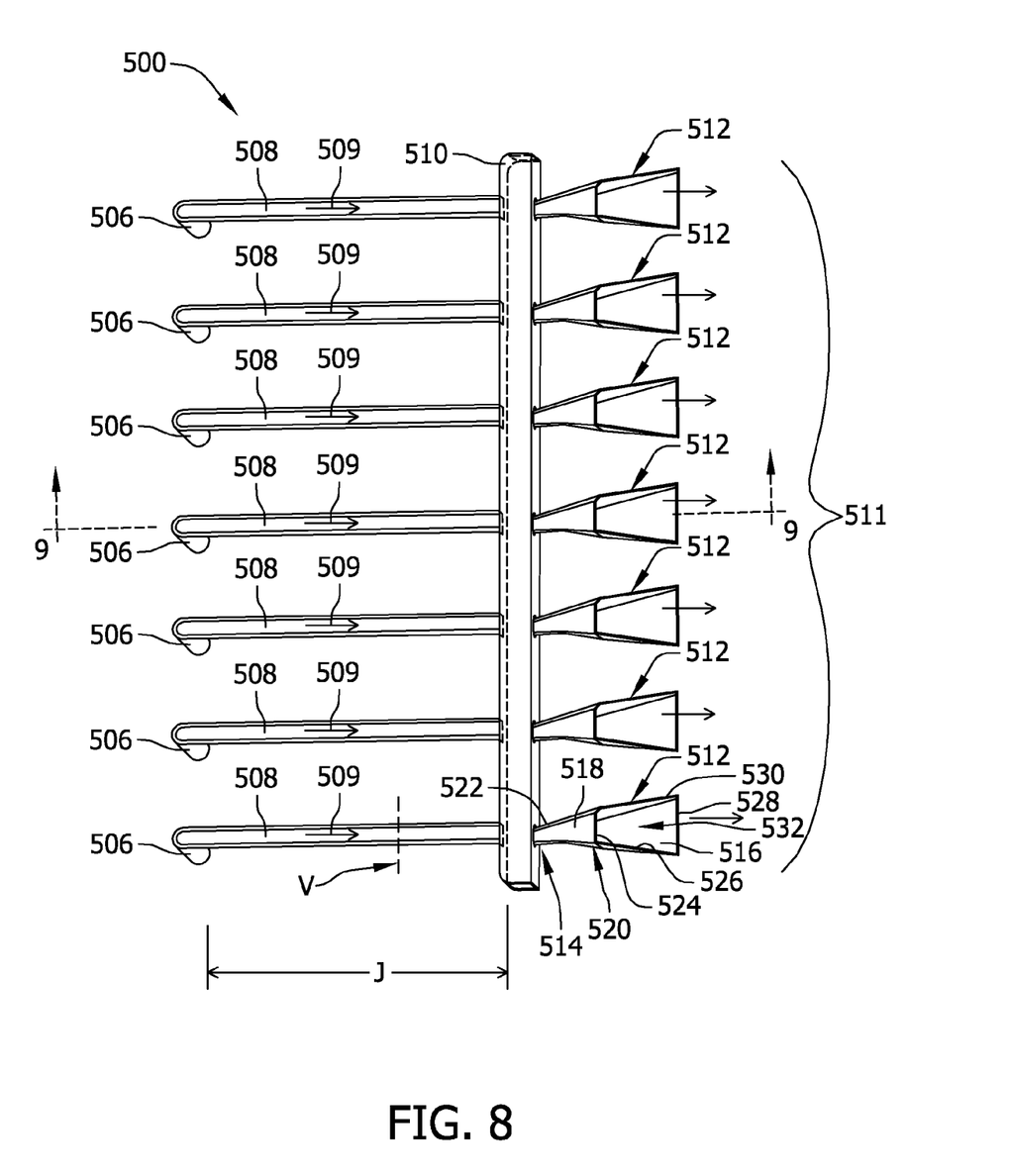
FIG. 8 is a top perspective view of an alternative exemplary microchannel system that can be used in in the cooling system illustrated in FIG. 2.
Figure 9:
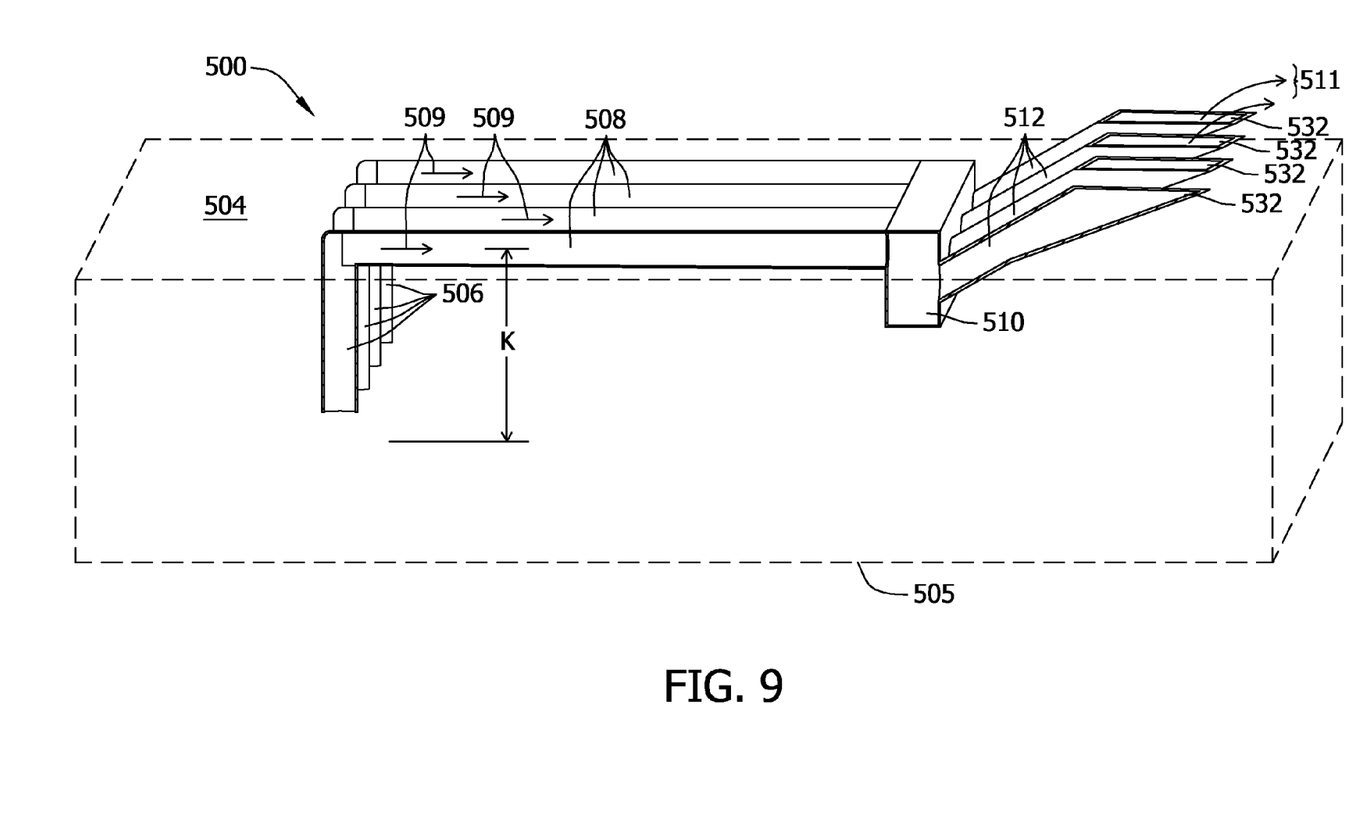
FIG. 9 is a side perspective view of the microchannel system illustrated in FIG. 8.

FIG. 8 is a top perspective view of an exemplary microchannel system 500 that can be used in cooling system 137. FIG. 9 is a side perspective view of microchannel system 500. Microchannel system 500 is used to supply cooling air through any structure within engine 100 (shown in FIGS. 1 and 2) for which both internal cooling and surface film cooling are desired. Microchannel system 500 includes a transversely-extending distribution passage 502 into which cooling air is channeled from a cooling air supply channel 501, which has any suitable configuration sufficient to enable system 500 to function as described. In the exemplary embodiment, distribution passage 502 is positioned a distance K below a component surface 504 (shown in FIG. 9) of a component 505.

Distribution passage 502 is coupled in flow communication to a plurality of feed passages 506. Each feed passage 506 is coupled in flow communication with a corresponding delivery channel 508. In each delivery channel 508, an air flow 509 proceeds in a direction indicated by the arrows. In the exemplary embodiment, each delivery channel 508 is configured with a substantially constant cross-sectional area along a length J, wherein the cross-sectional area is measured in a plane V extending perpendicularly to the direction of flow. Each delivery channel 508 is coupled in flow communication with a transversely-extending enclosed trench 510. In the exemplary embodiment, feed passages 506 and delivery channels 508 are provided with dimensions similar to those of feed passages 206 and sections 210 illustrated in FIGS. 3 and 4.

Trench 510 is, in turn, coupled to a plurality of discharge passages in the form of inclined nozzles 512. Each nozzle 512 includes an inlet end 514, an inclined outlet end wall 516 that intersects surface 504 (shown in FIG. 9), an inclined inlet end wall 518, a first side wall 520, and a second side wall 522 opposite first side wall 520. An edge 524 of inlet end wall 518, an edge 526 of first side wall 520, an edge 528 of outlet end wall 516, and an edge 530 of second side wall 522 define an opening 532 of each nozzle 512. In the exemplary embodiment, each of walls 516, 518, 520, and 522 diverge from one another in the direction of flow 509, as described with respect to walls 214 and 216 illustrated in FIG. 3 and/or as described with respect to walls 430 and 432 illustrated in FIG. 7. In an alternative embodiment, side walls 520 and 522 are substantially parallel, while walls 516 and 518 diverge. In another alternative embodiment, walls 518 and 516 are substantially parallel, while walls 520 and 522 diverge.

In the exemplary embodiment, air supply channel 501, distribution passage 502, feed passages 506, delivery channels 508, trench 510 and/or nozzles 512 are defined using any suitable passage-defining method, such as that described above with respect to system 200. Moreover, in the exemplary embodiment, air supply channel 501, distribution passage 502, feed passages 506, delivery channels 508, trench 510 and/or nozzles 512 have any suitable dimensions that enable microchannel system 500 to function as described herein. After air supply channel 501, distribution passage 502, feed passages 506, delivery channels 508, and trench 510 have been defined using any of the methods described herein, one or more cover layers (not shown), as described with respect to system 200 of FIGS. 3 and 4, are coupled to component 505 to form at least part of component surface 504. After coupling of the one or more cover layers, nozzles 512 are defined, using any method as described herein. In an alternative embodiment, one or more of structures 506, 508, 510, and/or 512 is cast-in, as described herein.

In operation, as illustrated in FIG. 9, cooling air flow 507 is channeled from air supply channel 501 into distribution passage 502, where flow 507 is divided into a plurality of flows 509 that are channeled through feed passages 506 and into delivery channels 508. As flows 509 are discharged from delivery channels 508 and enter enclosed trench 510, flows 509 merge and mix. Thereafter, the mixed flows are channeled into nozzles 512 and discharged at surface 504 as separate flows that merge again to define film 511.

The invention described herein provides several advantages over known systems and methods of cooling turbine structures using microchannels. Specifically, the microchannel systems described herein include diffuser sections, trenches, troughs, and/or discharge passages that provide the spreading and or diffusion of separate flows of cooling air, prior to discharge at a surface of a component that is cooled. In so doing, a higher film effectiveness is achieved for the exhausted coolant as it continues downstream. This reduces the temperature the downstream metal is exposed to thus enabling a greater amount of cooling to be achieved for a predefined cooling air flow rate. Exemplary embodiments of a method and a system for cooling turbine components are described above in detail. The method and system are not limited to the specific embodiments described herein, but rather, components of systems and/or steps of the methods may be utilized independently and separately from other components and/or steps described herein. For example, the systems and methods described herein are not limited to practice only with gas turbine rotor and stator blades, but also may be used in combination with other turbine components, including but not limited to combustor liners, transition pieces, and fuel nozzles. Moreover, the exemplary embodiment can be implemented and utilized in connection with many other rotary machine applications, other than gas turbines.

The method steps described herein are just examples. There may be many variations to the steps (or operations) described therein without departing from the spirit of the invention. For instance, except as specifically described, the steps may be performed in a differing order, or steps may be added, deleted or modified. All of these variations are considered a part of the claimed invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

While the invention has been described in terms of various specific embodiments, those skilled in the art will recognize that the invention can be practiced with modification within the spirit and scope of the claims.

What is claimed is:

1. A method for providing a cooling system for a turbine component that includes an outer surface that is exposed to combustion gases during turbine operation, said method comprising:
   defining a component base with at least one fluid supply passage coupleable to a source of cooling fluid;
   defining at least one feed passage in the component base, wherein the at least one feed passage is coupled in flow communication with the at least one fluid supply passage;
   defining a plurality of delivery channels in the component base, wherein the plurality of delivery channels are coupled in flow communication with the at least one feed passage;
   defining at least one cover layer on the base to cover the at least one feed passage and the plurality of delivery channels, wherein the at least one cover layer defines a boundary of the plurality of delivery channels, and at least in part defines the component outer surface;
   defining discharge passage through the at least one cover layer and extending at least partially within the component base, wherein the discharge passage is fluidly coupled at one end to the plurality of delivery channels and extends from within the component base through the at least one cover layer to the outer surface; and
   defining a diffuser section in the plurality of delivery channels such that a fluid channeled through the plurality of delivery channels is diffused prior to discharge adjacent the outer surface.

2. A method in accordance with claim 1, wherein defining a diffuser section in the plurality of delivery channels comprises:
   defining a first delivery channel section with a length, wherein the first delivery channel section includes a substantially constant cross-sectional area along the length; and
   defining a second delivery channel section, wherein the second delivery channel section includes a discharge cross-sectional area greater than the cross-sectional area of the first delivery channel section.

3. A method in accordance with claim 1, further comprising defining the discharge passage with an inlet cross-sectional area and a discharge cross-sectional area, such that the discharge cross-sectional area is greater than the inlet cross-sectional area.

4. A method in accordance with claim 1, wherein said method comprises:
   defining a plurality of feed passages in the component base, wherein each of the plurality of feed passages is coupled in flow communication with the at least one fluid supply passage; and
   defining the plurality of delivery channels in the component base, wherein each of the plurality of delivery channels is coupled in flow communication with a corresponding feed passage.

5. A method in accordance with claim 4, wherein said method comprises defining a distribution passage coupled in flow communication with the at least one fluid supply passage, the distribution passage further coupled in flow communication with each of the feed passages.

6. A method in accordance with claim 4, wherein defining the discharge passage through the at least one cover layer comprises defining an elongated trench in the at least one cover layer, wherein the elongated trench is coupled in flow communication with each of the plurality of delivery channels, such that cooling fluid channeled from the plurality of delivery channels into the elongated trench is subsequently discharged from the elongated trench to define a cooling fluid film adjacent the component outer surface.

7. A method in accordance with claim 6, wherein defining an elongated trench in the at least one cover layer comprises defining the elongated trench with an inlet end wall and an outlet end wall, wherein the inlet end wall and the outlet end wall diverge, such that cooling fluid channeled into the elongated trench is diffused prior to discharge from the elongated trench.

8. A system for providing cooling for a turbine component that includes an outer surface that is exposed to combustion gases during turbine operation, said system comprising:
   a component base that includes at least one fluid supply passage coupleable to a source of cooling fluid;
   at least one feed passage defined in the component base, wherein the at least one feed passage is coupled in flow communication with the at least one fluid supply passage;
   a plurality of delivery channels defined in the component base, wherein the plurality of delivery channels are coupled in flow communication with the at least one feed passage;
   at least one cover layer defined on the base to cover the at least one feed passage and the plurality of delivery channels, wherein the at least one cover layer defines a boundary of the plurality of delivery channels and the at least one cover layer defines at least in part the component outer surface;
   a discharge passage defined through the at least one cover layer and extending at least partially within the component base, wherein the discharge passage is fluidly coupled at one end to the plurality of delivery channels and extends from within the component base through the at least one cover layer to the outer surface; and
   a diffuser section defined in the plurality of delivery channels, such that a fluid channeled through the plurality of delivery channels is diffused prior to discharge adjacent the outer surface.

9. A system in accordance with claim 8, wherein said diffuser section comprises:

a first delivery channel section defined in the base, wherein the first delivery channel section includes a length and a substantially constant cross-sectional area along the length; and a second delivery channel section defined in the base and coupled in flow communication with the first delivery channel section, wherein the second delivery channel section includes a discharge cross-sectional area greater than the cross-sectional area of the first delivery channel section.

10. A system in accordance with claim 8, wherein the diffuser section includes an inlet cross-sectional area and a discharge cross-sectional area, such that the discharge cross-sectional area is greater than the inlet cross-sectional area.

11. A system in accordance with claim 8, said system comprising:

a plurality of feed passages defined in the component base, wherein each of the plurality of feed passages is coupled in flow communication with the at least one fluid supply passage, the plurality of delivery channels is defined in the component base, and each of the plurality of delivery channels is coupled in flow communication with a corresponding feed passage.

12. A system in accordance with claim 11, wherein said system comprises comprising a distribution passage defined in the base and coupled in flow communication with the at least one fluid supply passage, and wherein said distribution passage is coupled in flow communication with each of the feed passages.

13. A system in accordance with claim 11, wherein said system comprises an elongated trench defined in the at least one cover layer, and wherein the elongated trench is coupled in flow communication with each of the plurality of delivery channels, such that cooling fluid channeled from the plurality of delivery channels into the elongated trench is subsequently discharged from the elongated trench to define a cooling fluid film adjacent the component outer surface.

14. A system in accordance with claim 13, wherein the elongated trench comprises an inlet end wall and an outlet end wall, and wherein the inlet end wall and the outlet end wall diverge, such that cooling fluid channeled into the elongated trench is diffused prior to discharge from the elongated trench.

15. A gas turbine system, said gas turbine system comprising:

a compressor section;

a combustion system coupled in flow communication with said compressor section; and a turbine section coupled in flow communication with said combustion system, said turbine section comprising:

a component base that includes at least one fluid supply passage coupleable to a source of cooling fluid;

at least one feed passage defined in the component base, wherein the at least one feed passage is coupled in flow communication with the at least one fluid supply passage;

a plurality of delivery channels defined in the component base, wherein the plurality of delivery channels are coupled in flow communication with the at least one feed passage;

at least one cover layer defined on the base to cover the at least one feed passage and the plurality of delivery channels, wherein the at least one cover layer defines a boundary of the plurality of delivery channels and the at least one cover layer defines at least in part the component outer surface;

a discharge passage defined through the at least one cover layer and extending at least partially within the component base, wherein the discharge passage is fluidly coupled at one end to the plurality of delivery channels and extends from within the component base through the at least one cover layer to the outer surface; and a diffuser section defined in the plurality of delivery channels, such that a fluid channeled through the plurality of delivery channels is diffused prior to discharge adjacent the outer surface.

* * * * *